(12) United States Patent
Wang et al.

(10) Patent No.: US 10,270,510 B1
(45) Date of Patent: Apr. 23, 2019

(54) DIGITAL BEAMFORMING TRANSMITTER ARRAY SYSTEM WITH HARDWARE SHARING AND REDUCTION

(71) Applicant: Mitsubishi Electric Research Laboratories, Inc., Cambridge, MA (US)

(72) Inventors: Bingnan Wang, Belmont, MA (US); Zhengyu Peng, Cambridge, MA (US); Kyeongjin Kim, Lexington, MA (US); Pu Wang, Cambridge, MA (US); Rui Ma, Lexington, MA (US); Koon Hoo Teo, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/924,516

(22) Filed: Mar. 19, 2018

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01)

(58) Field of Classification Search
CPC ...... H04B 1/04; H04B 1/0483; H04B 1/0475; H04B 7/0617; H04B 7/0413
See application file for complete search history.

(56) References Cited

U.S. PATENT DOCUMENTS

| 7,103,383 | B2 | 9/2006 | Ito |
| 7,362,251 | B2 | 4/2008 | Jensen et al. |
| 7,619,997 | B2 | 11/2009 | Rofougaran |
| 7,830,982 | B2 | 11/2010 | Mesecher |
| 2005/0083996 | A1* | 4/2005 | Robinson ............ H04B 1/707 375/131 |
| 2011/0299441 | A1 | 12/2011 | Petrovic |
| 2013/0258972 | A1 | 10/2013 | Kim et al. |
| 2017/0019847 | A1 | 1/2017 | Han et al. |
| 2017/0230089 | A1 | 8/2017 | Kim et al. |

OTHER PUBLICATIONS

Bera et al., "Spread Spectrum-Digital Beam Forming Radar with Single RF Channel for Automotive Application," 9th International Radar Symposium India—2013 (Irsi—13). Nimhans Convention Centre, Bangalore India. Dec. 10-14, 2013.

* cited by examiner

*Primary Examiner* — Sophia Vlahos
(74) *Attorney, Agent, or Firm* — Gennadiy Vinokur; James McAleenan; Hironori Tsukamoto

(57) ABSTRACT

A transmitter including radio-frequency (RF) chains. Each RF chain includes a power amplifier, a band-pass filter, and an antenna for transmitting an analog signal using a beam-forming with an angle of departure (AOD) defined by phase shifts of the analog signals transmitted by the RF chains. A processor to determine digital signals for transmission from the RF chains. Wherein there is one-to-one correspondence between a digital signal and an RF chain. An encoder to encode the digital signals with binary codes to produce a set of encoded digital signals and to combine the encoded digital signals into a combined digital signal. A digital-to-analog converter to convert the combined digital signal into an analog domain to produce a combined analog signal. A decoder to decode, using the binary codes, the combined analog signal into a set of analog signals and to submit the analog signals into the corresponding RF chains.

20 Claims, 13 Drawing Sheets

*(Encoder)*

(Decoder)

DIGITAL BEAMFORMING TRANSMITTER ARRAY SYSTEM WITH HARDWARE SHARING AND REDUCTION

FIELD

The present disclosure relates generally to the field of multiple input, multiple output (MIMO) wireless communication systems, and more particularly, to MIMO wireless communication systems using beamforming transmissions.

BACKGROUND

The next-generation mobile communication system aims to achieve a 1,000-fold increase in capacity, a 10-fold increase in spectral and energy efficiencies, and a 25-fold increase in average cell throughput. Such significant enhancements can be achieved with large-scale multiple-input multiple-output (MIMO) antenna systems, which are also referred to as massive MIMO systems. These systems employ hundreds, or even thousands, of antennas at base stations (BSs) to serve tens or hundreds of user terminals. As such, array gains are expected to grow infinitely with the number of antennas at the BSs, in which case the radiated energy efficiency increases dramatically, and multiuser interference is eliminated completely.

The main promises of massive MIMO are (i) simplified signal processing in the multi-user case, since simple conjugate beamforming provides quasi-optimum performance, and (ii) drastically reduced energy consumption, due to the high beamforming gain, and thus the possibility of lowering the transmit power while still retaining a high signal-to-noise ratio (SNR). However, these advantages are counteracted, in practice, by the increased hardware complexity associated with having many antennas and many associated up/down conversion chains, and by the increased energy consumption due to all that hardware.

One method for reducing MIMO complexity while retaining most of its benefits is antenna selection, where a subset of size L taken from the set of the N available antenna signals is selected and connected, via a switch, to L (L<N) radio-frequency (RF) chains. For the transmit case, each RF chain includes a modulator, digital-to-analog converter (DAC), and a power amplifier and each transmit antenna requires an RF chain; similar statements can be made for the receive case. This method has shown to provide the same diversity order as a full-complexity MIMO system. However, this method does not provide the same amount of beamforming gain, and thus shows reduced performance in particular in channels with small angular spread, as typically occur in cellular systems. See U.S. Pat. No. 9,705,579.

Accordingly, there is a need to share the hardware resources for beamforming transmission of a signal by an array of antennas.

SUMMARY

The present disclosure relates generally to the field of multiple input, multiple output (MIMO) wireless communication systems, and more particularly, to MIMO wireless communication systems using beamforming transmissions. Wherein some embodiments of the present disclosure provide a multiple input, multiple output (MIMO) wireless communication system suitable for beamforming transmission of a signal by an array of antennas. An aspect of some embodiments can be to reduce a cost of implementation of a MIMO system with large number of antennas, e.g., massive MIMO systems, by sharing hardware resources needed for digital beamforming.

Beamforming is a signal processing technique used in antenna arrays for directional signal transmission or reception. This can be achieved by combining elements in an antenna array in such a way that signals at particular angles experience constructive interference while others experience destructive interference. Beamforming can be used at both the transmitting and receiving ends in order to achieve spatial selectivity.

To change the directionality of the array when transmitting, a beamformer can control the phase and relative amplitude of the signal at each transmission, in order to create a pattern of constructive and destructive interference in the wavefront. The digital beamforming can be performed at baseband to produce digital signals for the antenna array with phase shift and amplitude dependent on an angle of departure (AOD) of the transmitted beam. Such a baseband process is quite complicated in itself, but, in addition, each antenna needs its own RF feed to convert each digital signal in analog domain and to further process and transmit the analog signal. At high frequencies and with large number of antenna elements, this can be very costly increase of the complexity of the MIMO system.

To remedy these issues, some embodiments implement resource sharing using principles borrowed from the field a channel access used by various radio communication technologies. For example, some embodiments use principles of code-division multiple access (CDMA) to reuse a number of digital-to-analog converters (DAC). Further, one embodiment can reduce the number of DACs from a number equal to a size of an antenna array (i.e., one DAC for each antenna) to just one DAC, i.e., one DAC for each real and imaginary components of the signal.

CDMA is a spread-spectrum multiple-access method that spreads the bandwidth of the data uniformly for the same transmitted power. A spreading code is a pseudo-random code that has a narrow ambiguity function. In CDMA a locally generated code runs at a much higher rate than the data to be transmitted. Data for transmission is combined by bitwise XOR (exclusive OR) with the faster code.

Each signal in a CDMA system can be modulated with a different code and encoded signals are combined together. The separation of the signals can be made by correlating the received signal with the locally generated code of the desired signal. If the signal matches the desired code, then the correlation function is high and the system can extract that signal. If the desired code has nothing in common with the signal, the correlation should be as close to zero as possible (thus eliminating the signal). To achieve such cross-correlation, some embodiment can use orthogonal binary codes, e.g., Walsh code.

To that end, one embodiment discloses a transmitter including a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains. The transmitter also includes a baseband processor to determine a set of digital signals for transmission from the set of RF chains. The digital signals cam be generated using the principles of digital beamforming, such that there is one-to-one correspondence between a digital signal and an RF chain, and each digital signal has a phase shift with respect to another digital signal determined according to the AOD.

To reduce a number of hardware components requires for processing the digital signals, some embodiments used principles of CDMA transmission. For example, the transmitter can include an encoder to encode the set of digital signals with a set of binary codes to produce a set of encoded digital signal, which are combined into a combined digital signal, and a digital-to-analog converter to convert the combined digital signal into an analog domain to produce a combined analog signal. In such a manner, the DAC converts the combination of the digital signals allowing reusing the DAC by multiple RF chains. The signals in the combined analog signal are later separated using the same codes applied for the encoding. For example, the transmitter includes a decoder to decode, using the set of binary codes, the combined analog signal into a set of analog signals having the phase shifts of the corresponding digital signals and to submit the set of analog signals into the corresponding RF chains.

Some embodiments of the present disclosure can be based on understanding that the encoder and the decoder can be synchronized, such that the decoding of a portion of the combined RF signal encoded with a portion of the binary code is aligned with the portion of the binary code during the decoding. There can be different techniques for the synchronization employed by the different embodiments. For example, some embodiments can be based on a realization that the encoder and the decoder are synchronized using a feedback loop adjusting the alignment of the portion of the binary coded during the encoding and the decoding based on variations in power of the RF signals.

For example, in one embodiment, the transmitter can include a power detector to produce voltage levels indicative of variations in power of the analog signals. This embodiment is based on understanding that when the codes at the encoder and the decoder are synchronized, the power level of the decoded signal reaches to the maximum value. The reason is that, if the coding and decoding is synchronized, the original signal can be recovered, and the power level in the signal is not reduced. However, if there is an offset in the coding and decoding process, the original signal cannot be fully recovered. Such that some of the signal will be spread to other frequencies out of band, therefore causing a reduction of the power level in the decoded signal.

The power information is submitted back to the digital domain for synchronization. To that end, in one implementation, the transmitter can include an analog-to-digital converter to convert the voltage levels into digital voltage signals and a binary code adjustor to determine a set of offsets aligning the binary codes for the encoding and the decoding. For example, the binary code adjustor applies the offsets to the binary code used by the encoder and transmits the adjusted binary codes to the decoder. Different embodiments can use different method for determining code offsets. For example, in one embodiment, the binary code adjustor determines the set of offsets by optimizing a cost function using an extremum seeking method.

Some embodiments of the present disclosure can be based on understanding that the synchronization is sensitive to the binary code selected for the encoding and not all orthogonal codes sufficiently separate the encoded signals code. To that end, in one embodiment, the binary code adjustor selects a subset of binary codes from the set of binary codes and uses only the subset of binary codes for the synchronization by applying, at different points of time, the subset of binary codes to encode different digital signals from the set of digital signals and to decode the corresponding analog signals. For example, in one implementation with 8 bits Walsh code, the subset of Walsh code 7 (1, −1, 1, −1, 1, −1, 1, −1) can be used for synchronization.

In some embodiments, the transmitter can also include a frequency up-converter to up-convert the frequency of the combined analog signal from baseband frequency to a carrier frequency such that the analog signals in the set of analog signals are RF signals. In those embodiments, multiple RF chains share the same frequency up-converter. In alternative embodiment, each RF chain includes a frequency up-converter to up-convert the frequency of the analog signal from baseband frequency to a carrier frequency. This embodiment is easier to implement.

In some embodiments, the DAC can be implemented as mixed-signal circuit. Alternatively, in at least one embodiment, the baseband processor modulates the combined digital signal to produce a modulated signal, and the DAC includes a low-pass filter filtering the modulated signal to produce the combined analog signal. This embodiment simplifies implementation of the DAC.

Aspects of some embodiments of the present disclosure provide for systems that reduce the number of DACs, since this is the most computationally expensive component. In addition to being able to operate and be structured with lower cost digital coding components and mixers, the more significant aspect is reducing DACs. Further notes, is that the Walsh code design can be key to synchronization, among other key aspects.

According to an embodiment of the present disclosure, a transmitter including a set of radio-frequency (RF) chains. Each RF chain includes a power amplifier, a band-pass filter, and an antenna for transmitting an analog signal using a beamforming with an angle of departure (AOD) defined by phase shifts of the analog signals transmitted by the set of RF chains. A baseband processor to determine a set of digital signals for transmission from the set of RF chains. Wherein there is one-to-one correspondence between a digital signal and an RF chain. Wherein each digital signal has a phase shift with respect to another digital signal determined according to the AOD. An encoder to encode the set of digital signals with a set of binary codes to produce a set of encoded digital signals and to combine the set of encoded digital signals into a combined digital signal. A digital-to-analog converter to convert the combined digital signal into an analog domain to produce a combined analog signal. A decoder to decode, using the set of binary codes, the combined analog signal into a set of analog signals having the phase shifts of the corresponding digital signals and to submit the set of analog signals into the corresponding RF chains.

According to an embodiment of the present disclosure, a transmitter having a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains. Wherein a baseband processor to determine a set of digital signals for transmission from the set of RF chains. Such that there is one-to-one correspondence between a digital signal and an RF chain, wherein each digital signal has a phase shift with respect to another digital signal determined according to the AOD. The transmitter including an encoder to encode the set of digital signals with a set of binary codes to produce a set of encoded digital signals and to combine the set of encoded digital signals into a combined digital signal. A digital-to-analog converter to convert the combined digital signal into an analog domain to produce a combined analog signal. A decoder to decode, using the set of binary codes, the combined analog signal into a set of analog signals having the phase shifts of the corresponding digital signals and to submit the set of analog signals into the corresponding RF chains. Wherein the correspondence between the digital signal and analog signal is established through the same binary code used by the encoder to encode the digital signal and the decoder to decode the combined analog signal.

According to an embodiment of the present disclosure, a transmitter having a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains. Wherein a baseband processor to determine a set of digital signals for transmission from the set of RF chains. Such that there is one-to-one correspondence between a digital signal and an RF chain. Wherein each digital signal has a phase shift with respect to another digital signal determined according to the AOD. The transmitter including an encoder to encode the set of digital signals with a set of binary codes to produce a set of encoded digital signals and to combine the set of encoded digital signals into a combined digital signal. A digital-to-analog converter to convert the combined digital signal into an analog domain to produce a combined analog signal. A decoder to decode, using the set of binary codes, the combined analog signal into a set of analog signals having the phase shifts of the corresponding digital signals and to submit the set of analog signals into the corresponding RF chains. Wherein the encoder and the decoder are synchronized, the power level of the decoded signal reaches to the maximum value.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates generally to the field of multiple input, multiple output (MIMO) wireless communication systems, and more particularly, to MIMO wireless communication systems using beamforming transmissions. Wherein some embodiments of the present disclosure provide a multiple input, multiple output (MIMO) wireless communication system suitable for beamforming transmission of a signal by an array of antennas. An aspect of some embodiments can be to reduce a cost of implementation of a MIMO system with large number of antennas, e.g., massive MIMO systems, by sharing hardware resources needed for digital beamforming.

Some embodiments of the present disclosure include a digital beamforming transmitter array system with hardware sharing and reduction. In the digital domain, N channels of in-phase (I) and quadrature (Q) signals are multiplied with M bits orthogonal spreading codes. The multiplied signals are added together separately to form I channel and Q channel digital signals, and I and Q channel digital signals are converted to analog signals with corresponding digital-to-analog convertors (DAC). After the DACs, the signals are up-converted into one-channel radio frequency (RF) signal, and then equally divided into N channels through a 1-to-N power divider. Each channel from the 1-to-N power divider is mixed with its corresponding N bits orthogonal spreading code by a RF decoding mixer. After the RF decoding mixer, the signal is passed through a power amplifier (PA), a band-pass filter, a coupler and then transmitted by an antenna. The coupler in each channel takes a portion of the transmitted signal to a power detector, which converts the power level into a direct current (DC) voltage. This DC voltage is sampled by an analog-to-digital convertor (ADC), and an algorithm is implemented to adjust the offsets of the spreading codes in order to make sure the spreading codes are synchronized with the signal at each mixer.

Figure 1A:
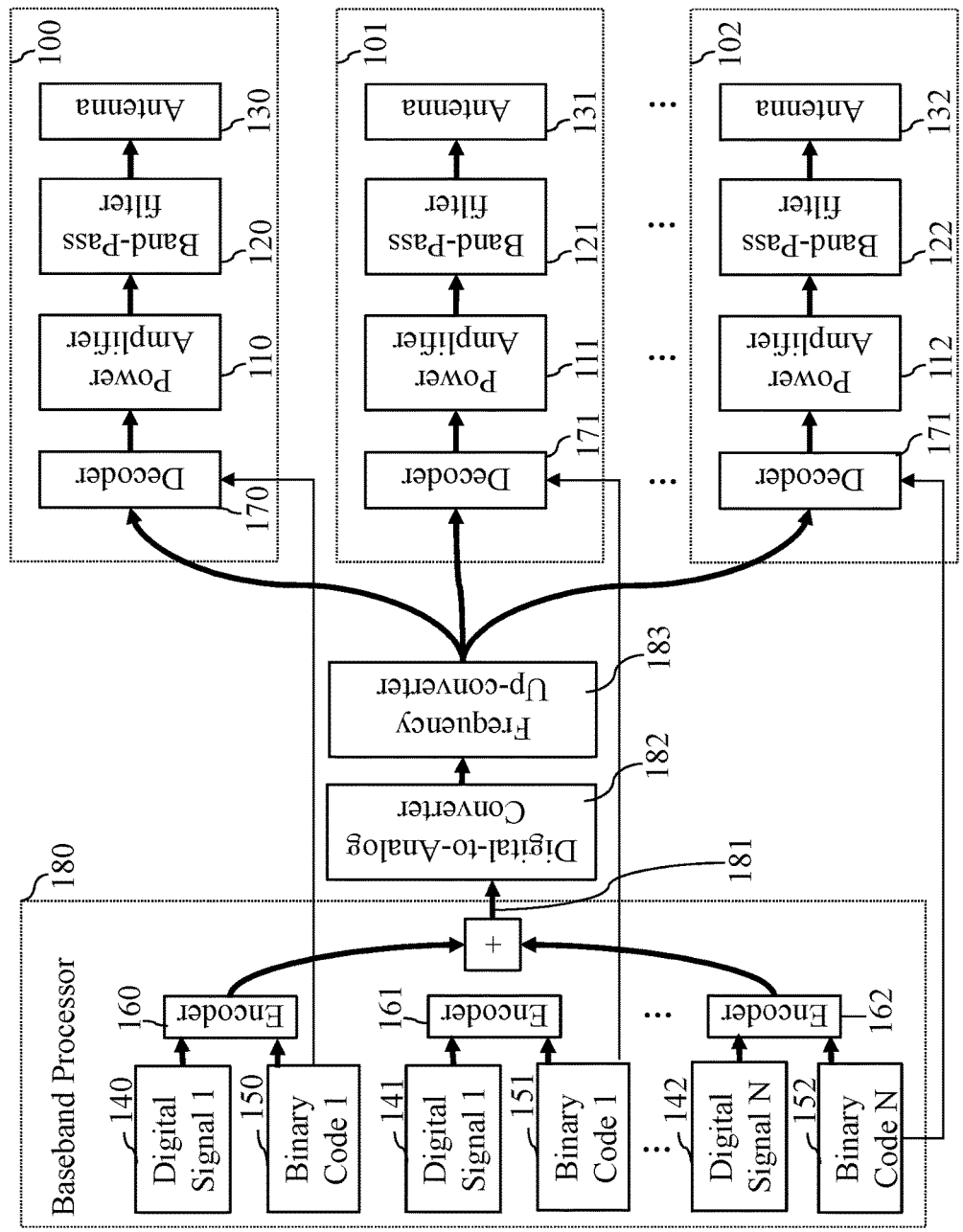
FIG. 1A illustrates a block diagram of some methods of an embodiment for a wireless communication system using beamforming transmissions, according to one embodiment of the present disclosure.

FIG. 1A illustrates a block diagram of some components used to implement a digital beamforming transmitter array system with hardware sharing and reduction, according to embodiments of the present disclosure.

FIG. 1A shows a set of radio-frequency (RF) chains, 100, 101, 102, each RF chain includes a power amplifier, 110, 111, 112, a band-pass filter, 120, 121, 122, and an antenna, 130, 131, 312, for transmitting an analog signal using a beamforming with an angle of departure (AOD) defined by phase shifts of the analog signals transmitted by the set of RF chains. A baseband processor, 180, is used to determine a set of digital signals, 140, 141, 142, for transmission from the set of RF chains, 100, 101, 102, wherein there is one-to-one correspondence between a digital signal, 140, 141, 142, and an RF chain, 100, 101, 102, wherein each digital signal, 140, 141, 142, has a phase shift with respect to another digital signal determined according to the AOD. In the baseband processor, 180, an encoder, 160, 161, 162, is used to encode the set of digital signals, 140, 141, 142, with a set of binary codes, 150, 151, 152, to produce a set of encoded digital signals and to combine, 181, the set of encoded digital signals into a combined digital signal. A digital-to-analog converter, 182, is used to convert the combined digital signal into an analog domain to produce a combined analog signal. Then, a frequency up-converter, 183, is used to convert the combined analog signal to a combined RF signal. After the frequency up-converter, 183, a decoder, 170, 171, 172, is used to decode, using the set of binary codes, 150, 151, 152, the combined RF signal into a set of RF signals having the phase shifts of the corresponding digital signals and to submit the set of analog signals into the corresponding RF chains.

Figure 2A:
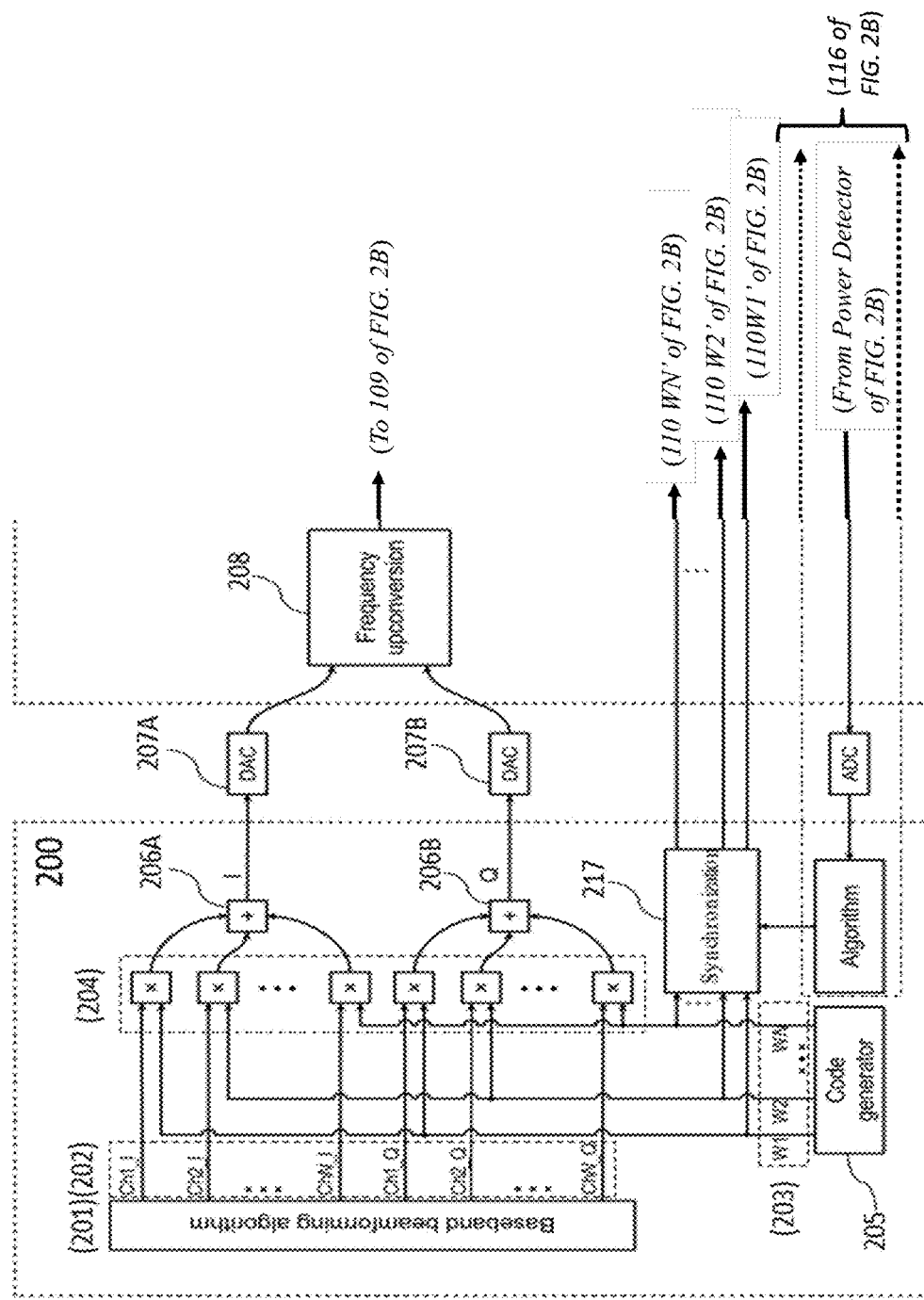
FIG. 2A and FIG. 2B are schematics of a digital beamforming transmitter array system with hardware sharing and reduction, according to embodiments of the present disclosure.
Figure 2B:
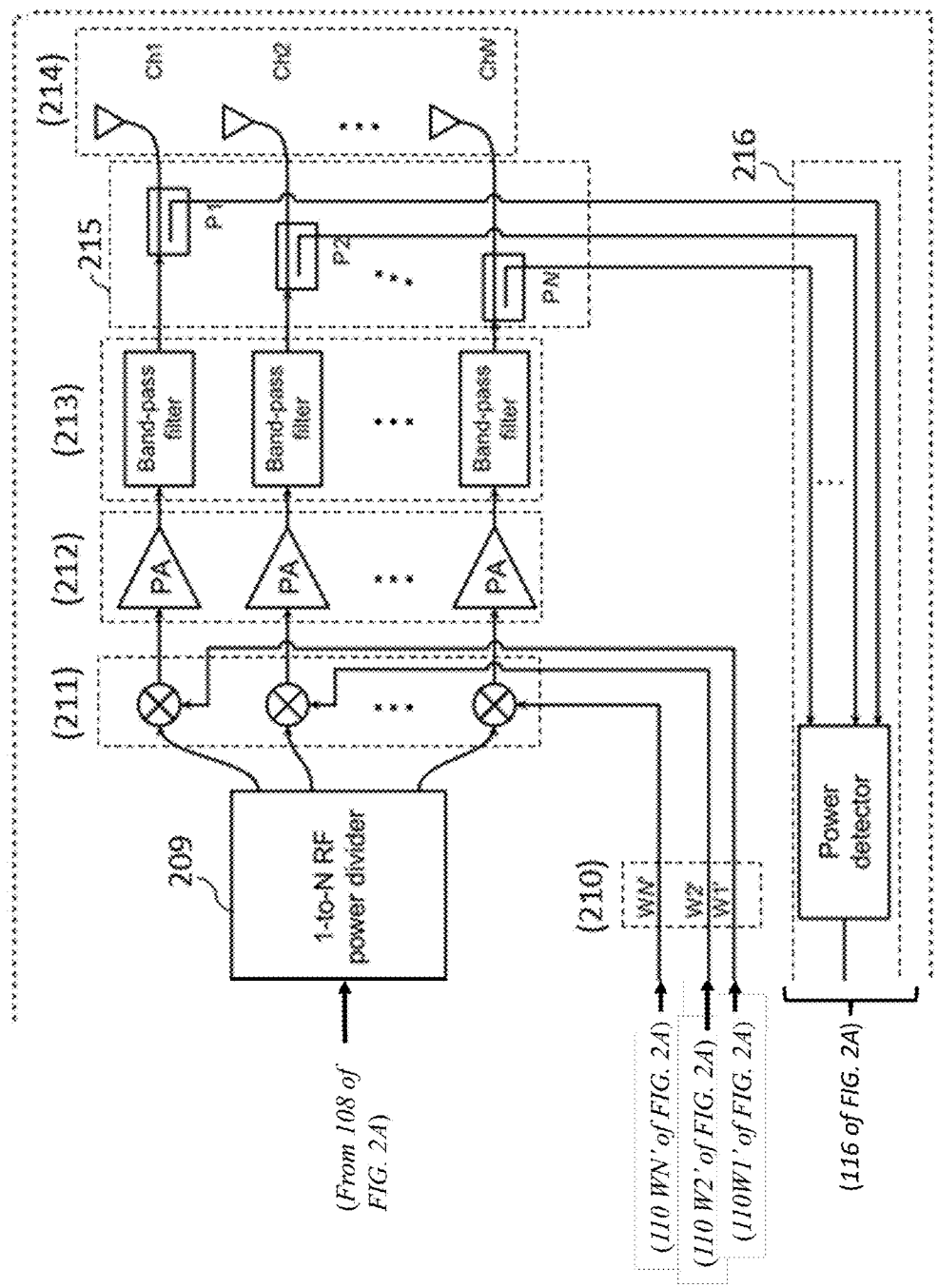

FIG. 2A and FIG. 2B are schematics of a digital beamforming transmitter array system with hardware sharing and reduction, according to embodiments of the present disclosure.

FIG. 2A shows in a baseband processor, 200, N channels signals, 202, are generated by a baseband beamforming algorithm, 201. This beamforming algorithm, 201, can be any digital beamforming methods. For each channel, it includes an in-phase (I) signal and a quadrature (Q) signal. Both of the I signal and Q signal are encoded with one M-bit binary spreading code, 203, by a digital multiplication operation, 104. The M-bit binary spreading codes {W1, W2, ..., WN}, 203, are generated repeatedly in the digital domain by a code generator, 205. After multiplication, all the in-phase signals are added together through a digital adder, 206A, and all the quadrature signals are also added together through another digital adder, 206B. The two added signals are then converted into analog signals by two digital-to-analog convertors (DACs), 207A, 207B.

Referring to FIG. 2B, the analog signals are passed through a frequency up-converter, 208 of FIG. 2A, and equally divided in to N channels by a 1-to-N RF power divider, 209 of FIG. 2B. Wherein each channel, the signal is mixed with its corresponding code {W1', W2', ..., WN'}, 210, by a RF decoding mixer, 211 of FIG. 2B. The code {W1', W2', ..., WN'}, 210, for the RF decoding mixer, 211, has time offsets to make sure it is synchronized with the code {W1, W2, ..., WN}, 203, embedded in the signal. After the RF decoding mixer, 211, the signal is further processed by a power amplifier (PA), 212, a band-pass filter, 213, and transmitted by the antenna, 214. A feed-back path, 116, is used in the system to synchronize the code.

Figure 3A:
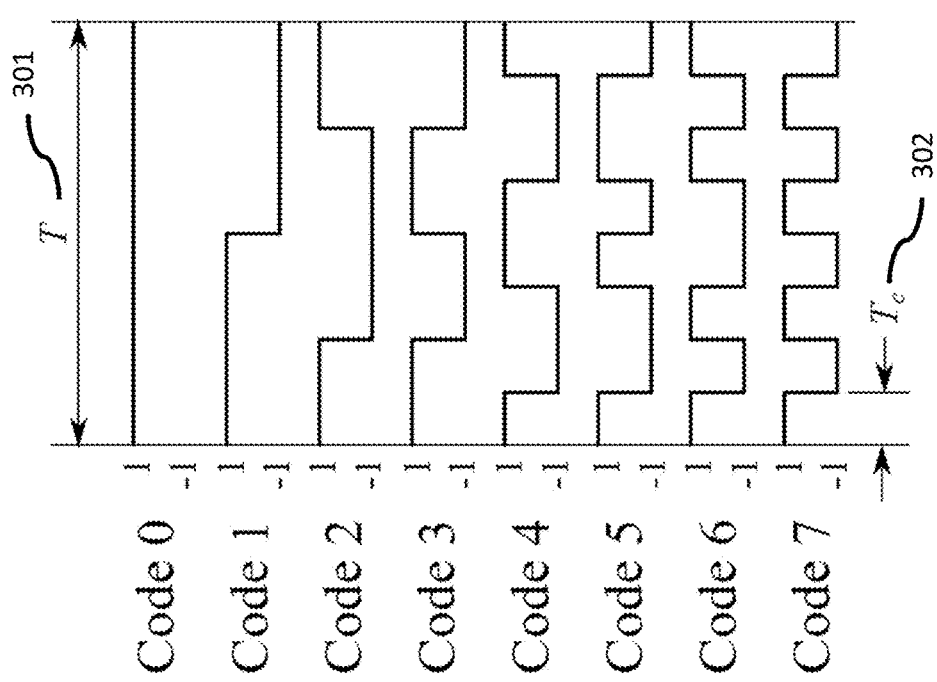
FIG. 3A shows an example of 8-bit Walsh code sequences, according to embodiments of the present disclosure.

FIG. 3A shows an example of 8-bit Walsh code sequences, according to embodiments of the present disclosure. In particular, FIG. 3A shows an example of the code sequences used to encode signals from different channels. The example code set is 8-bit Walsh code set. The total period of one code sequence is T, 301, and the length of one bit is Tc, 302. The code 0 in a 8-bit Walsh code set is {1, 1, 1, 1, 1, 1, 1, 1}, code 1 is {1, 1, 1, 1, 0, 0, 0, 0}, code 2 is {1, 1, 0, 0, 0, 0, 1, 1}, code 3 is {1, 1, 0, 0, 1, 1, 0, 0}, code 4 is {1, 0, 0, 1, 1, 0, 0, 1}, code 5 is {1, 0, 0, 1, 0, 1, 1, 0}, code 6 is {1, 0, 1, 0, 0, 1, 0, 1} and code 7 is {1, 0, 1, 0, 1, 0, 1, 0}.

Figure 3B:
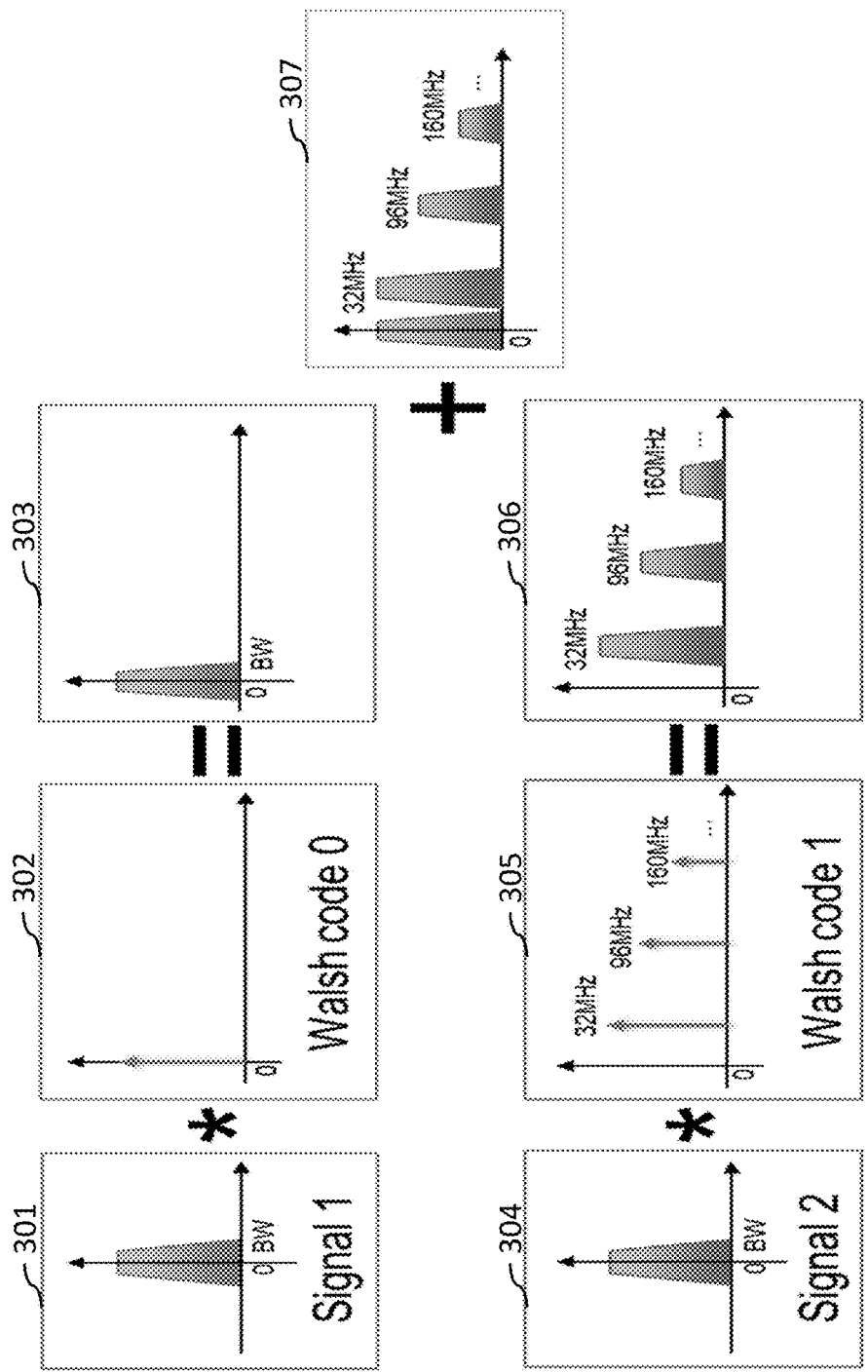
FIG. 3B illustrates a principle of an encoding part of CDM based path sharing, according to embodiments of the present disclosure.

FIG. 3B illustrates a principle of an encoding part of CDM based path sharing, according to embodiments of the present disclosure. In particular, FIG. 3B shows an example of coding two signals with two Walsh code sequences. In this example, all the signals, 301, 304, and Walsh code sequences, 302, 305, are illustrated in frequency domain. Since code 0 is {1, 1, 1, 1, 1, 1, 1, 1}, which is a DC voltage. In frequency domain, code 0 is a Dirac delta function, 302. For code 1, it is a series of Dirac delta functions located at 32 MHz, 96 MHz and 160 MHz, etc, 305, when $T=3.125\times 10^{-8}$ s. During coding, signal 1 is multiplied with code 0, and signal 2 is multiplied with code 1. Then, the coded signal 1, 303, and the coded signal 2, 306, are added together to be the combined signal, 307.

Figure 3C:
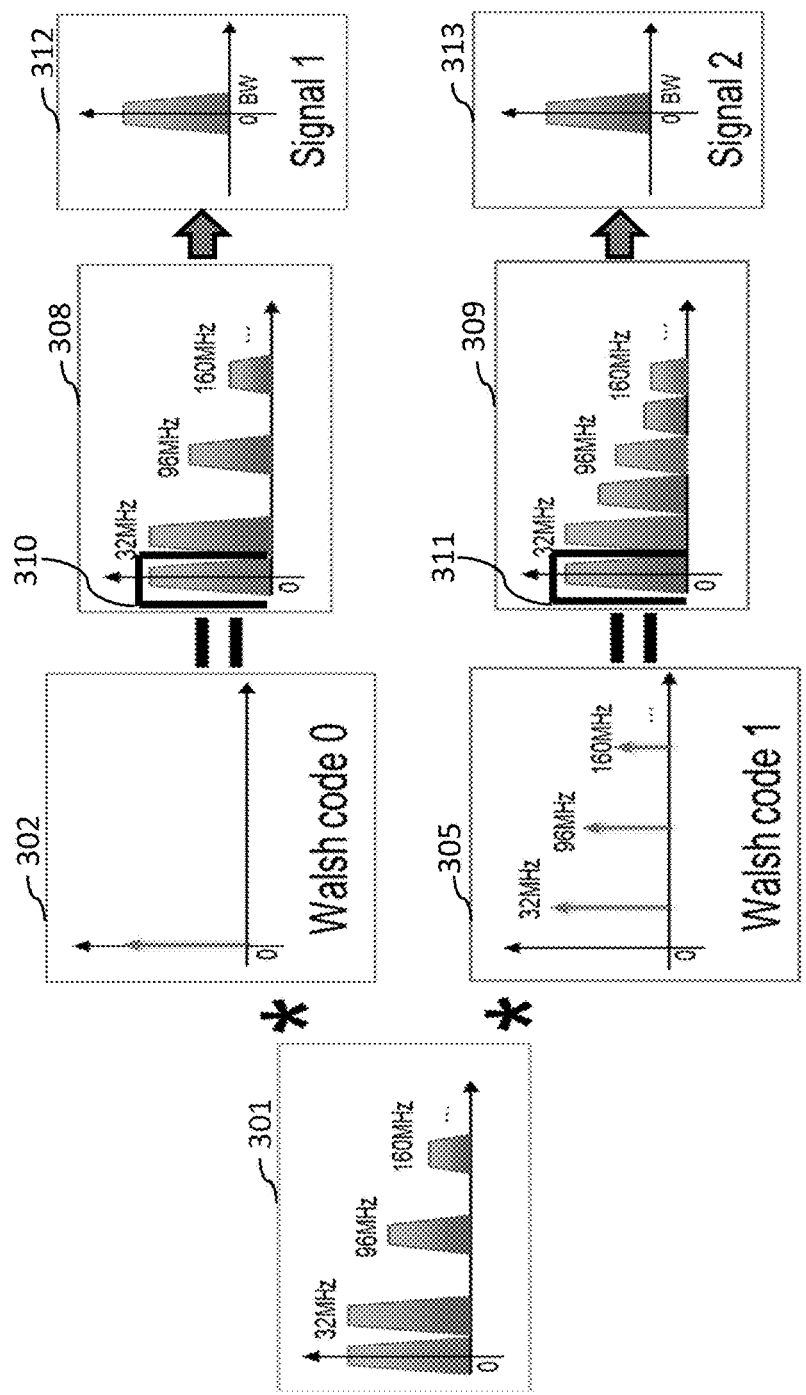
FIG. 3C illustrates a principle of the decoding part of CDM based path sharing, according to embodiments of the present disclosure.

FIG. 3C illustrates a principle of the decoding part of CDM based path sharing, according to embodiments of the present disclosure. In particular, FIG. 3C shows the decoding procedure. During the decoding procedure, the combined signal, 307 of FIG. 3B, is multiplied with code 0, 302, and code 1, 305, separately. After multiplication, the two signals, 308, 309, are filtered by low-pass filters, 310, 311. Thus, the signal 1, 312, and signal 2, 313, are fully recovered.

Figure 4:
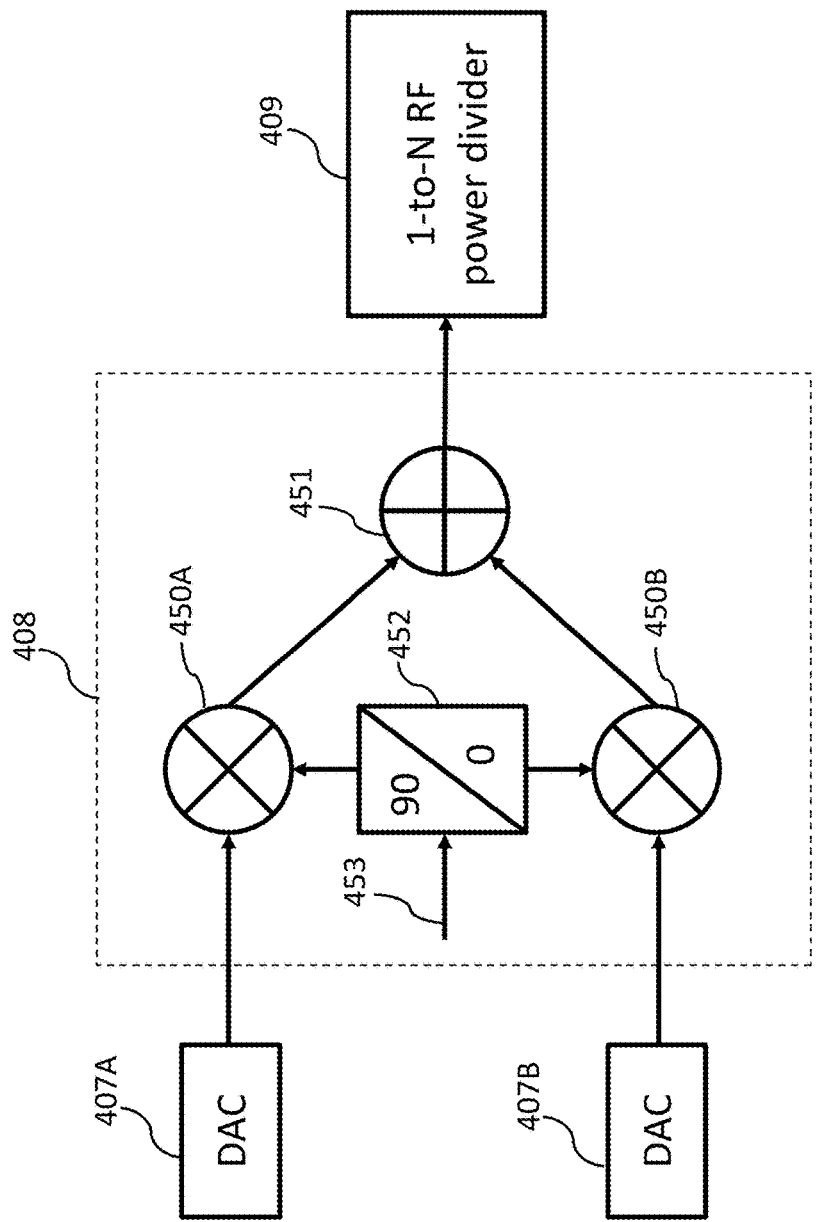
FIG. 4 illustrates a diagram of a frequency upconverter, according to embodiments of the present disclosure.

FIG. 4 illustrates a diagram of a frequency upconverter, according to embodiments of the present disclosure. In particular, FIG. 4 show the realization of the frequency upconverter, 408, that includes a local oscillator signal, 453, a quadrature power divider, 452, two mixers, 450A, 450B, and a power combiner, 451. The local oscillator signal, 453, is divided into two signals by the quadrature power divider, 452. The output of the quadrature power divider, 452, have 90-degree phase different. The output of the quadrature power divider, 452, are fed into the mixers, 450A, 450B, separately. The output signals of the DACs, 407A, 407B, are also fed into the mixers, 450A, 450B. The mixed signals from the mixers, 450A, 450B, are combined together by the power combiner, 451. The power combiner, 451, is connected with the 1-to-N RF power divider, 409.

Figure 5:
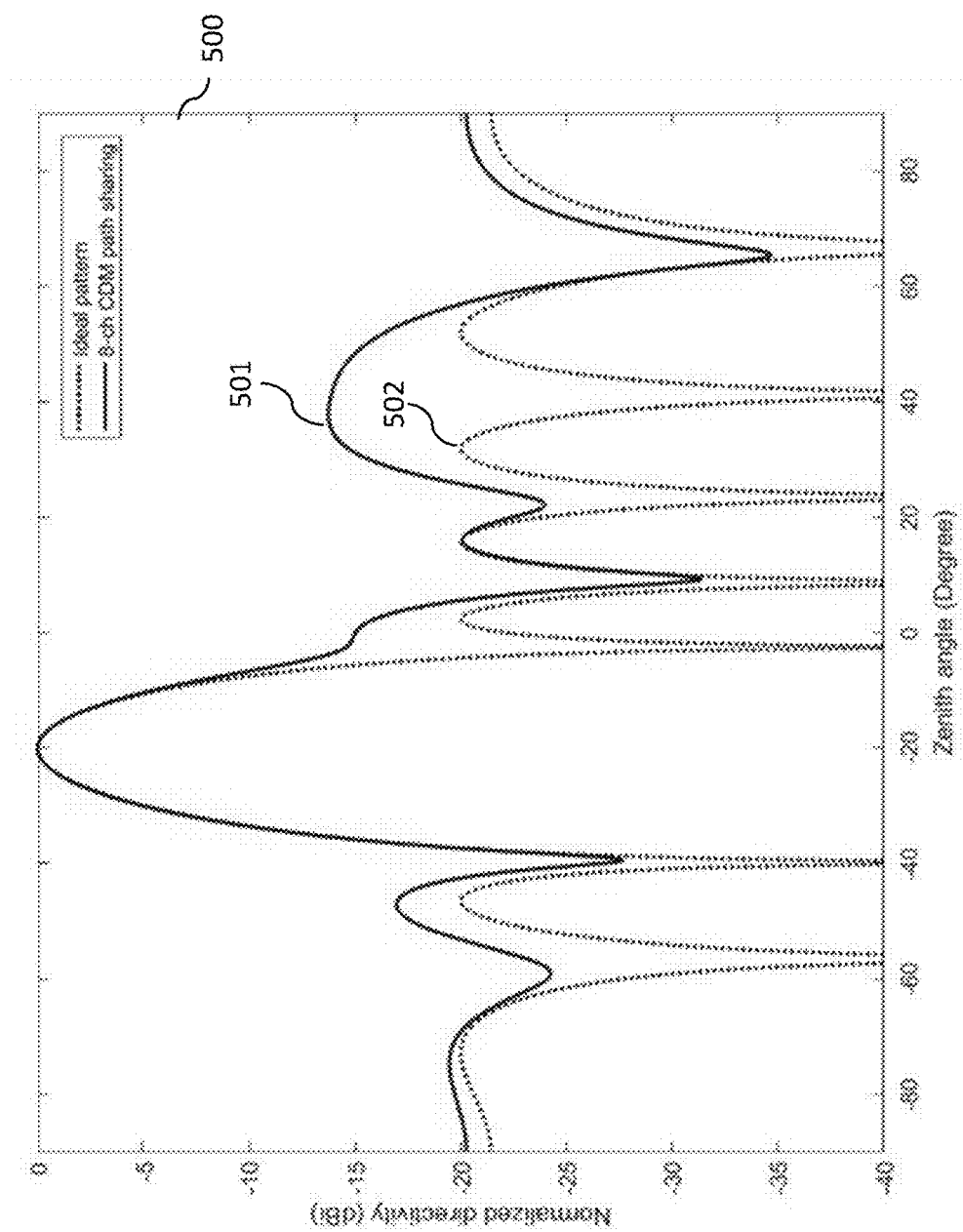
FIG. 5 illustrates the impact on beam patterns due to serious offset during decoding, according to embodiments of the present disclosure.

FIG. 5 illustrates the impact on beam patterns due to serious offset during decoding, according to embodiments of the present disclosure. In particular, the impact of the synchronization on the beamforming patterns 500 is illustrated. In order to accurately separate the signal for each channel after the RF decoding mixer, the code for the input of each RF decoding mixer has to be synchronized with the code embedded in the signal. When the code is synchronized during decoding, the pattern is shown in 502. However, if the code is not synchronized, 501, the side lobes of the beamforming pattern becomes worse.

Figure 6A:
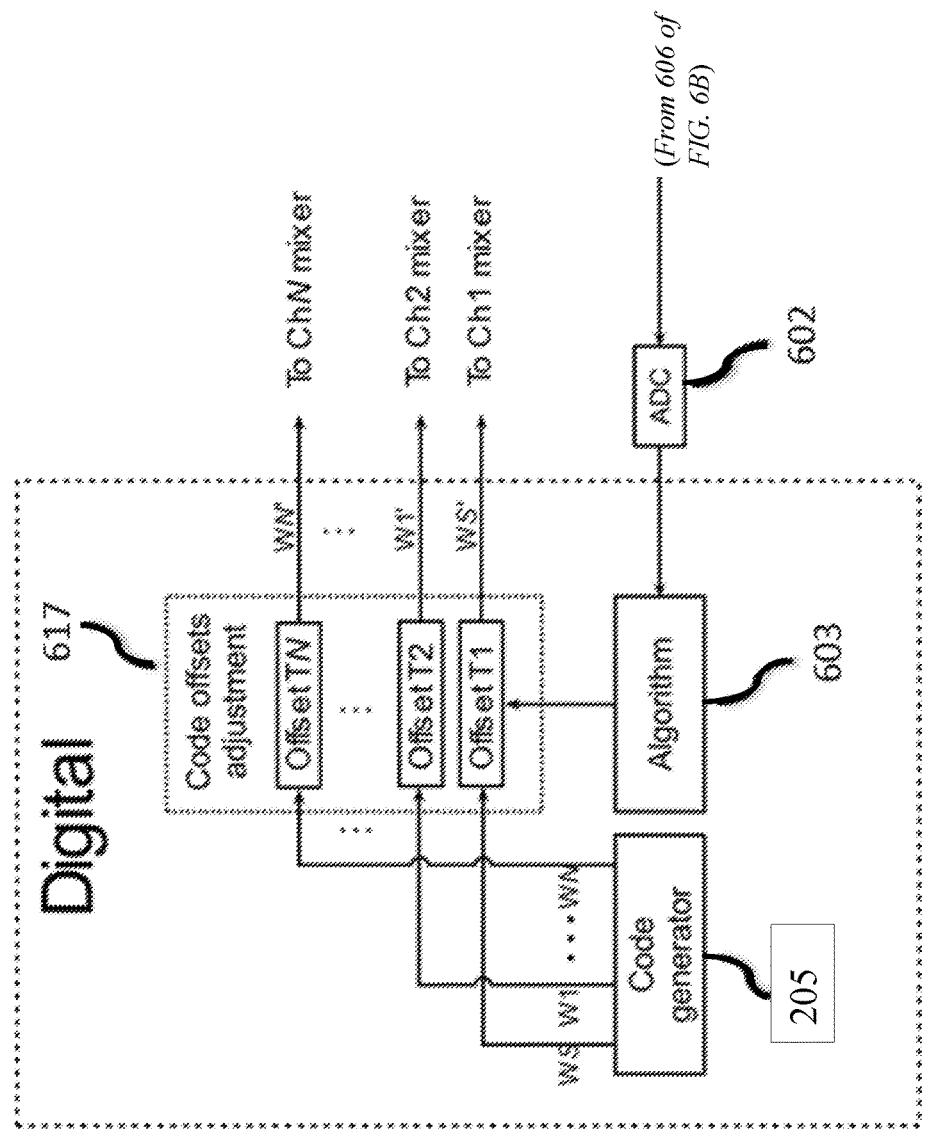
FIG. 6A and FIG. 6B illustrate some details of the code synchronization structure, according to embodiments of the present disclosure.
Figure 6B:
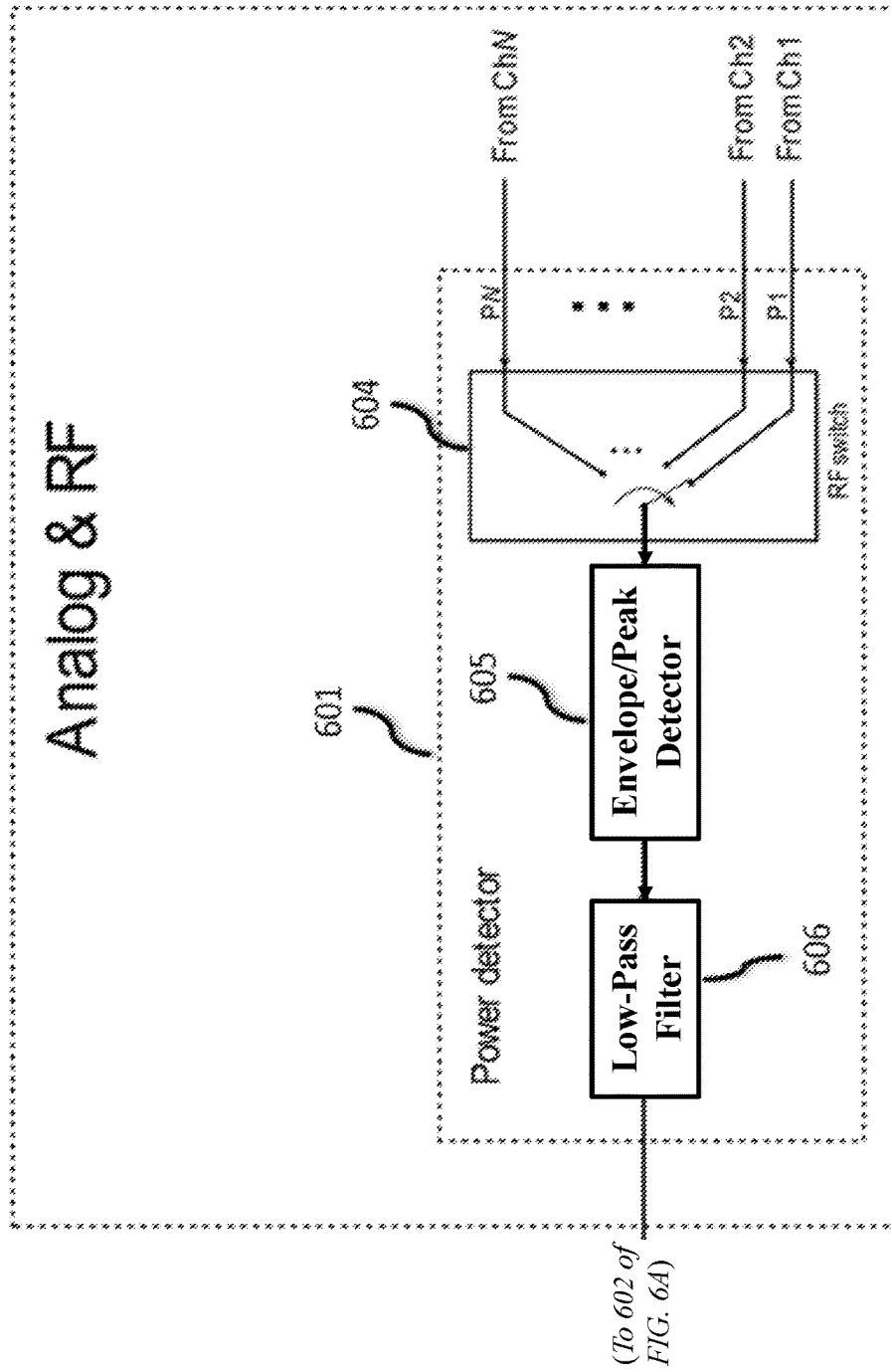

FIG. 6A and FIG. 6B illustrate some details of the code synchronization structure, according to embodiments of the present disclosure. For example, in order to accurately separate the signal for each channel after the RF decoding mixer, a synchronization architecture is invented to achieve the synchronization. FIG. 6A and FIG. 6B show the invented code synchronization architecture. The coupler, 215, in FIG. 2B takes portions of the signal to the power detector, 601 of FIG. 6B, wherein the power detector, 601, the signal's power level is converted to a voltage signal. The voltage signal is converted into digital signal through an analog-to-digital converter (ADC), 602 of FIG. 6A. An algorithm, 603 of FIG. 6A, is used to automatically adjust the code offsets, 217 of FIG. 6A, of each channel according to the voltage signal and a coupler. In the power detector, 601 of FIG. 6B, there is a RF switch, 604, an envelope detector, 605, and a low-pass filter, 606. The input N channel signals are selected by a RF switch, 604, and then the power of the signal is detected by the envelope detector, 605. The output of the envelop detector, 605, is filtered by a low-pass filter, 606.

Figure 7:
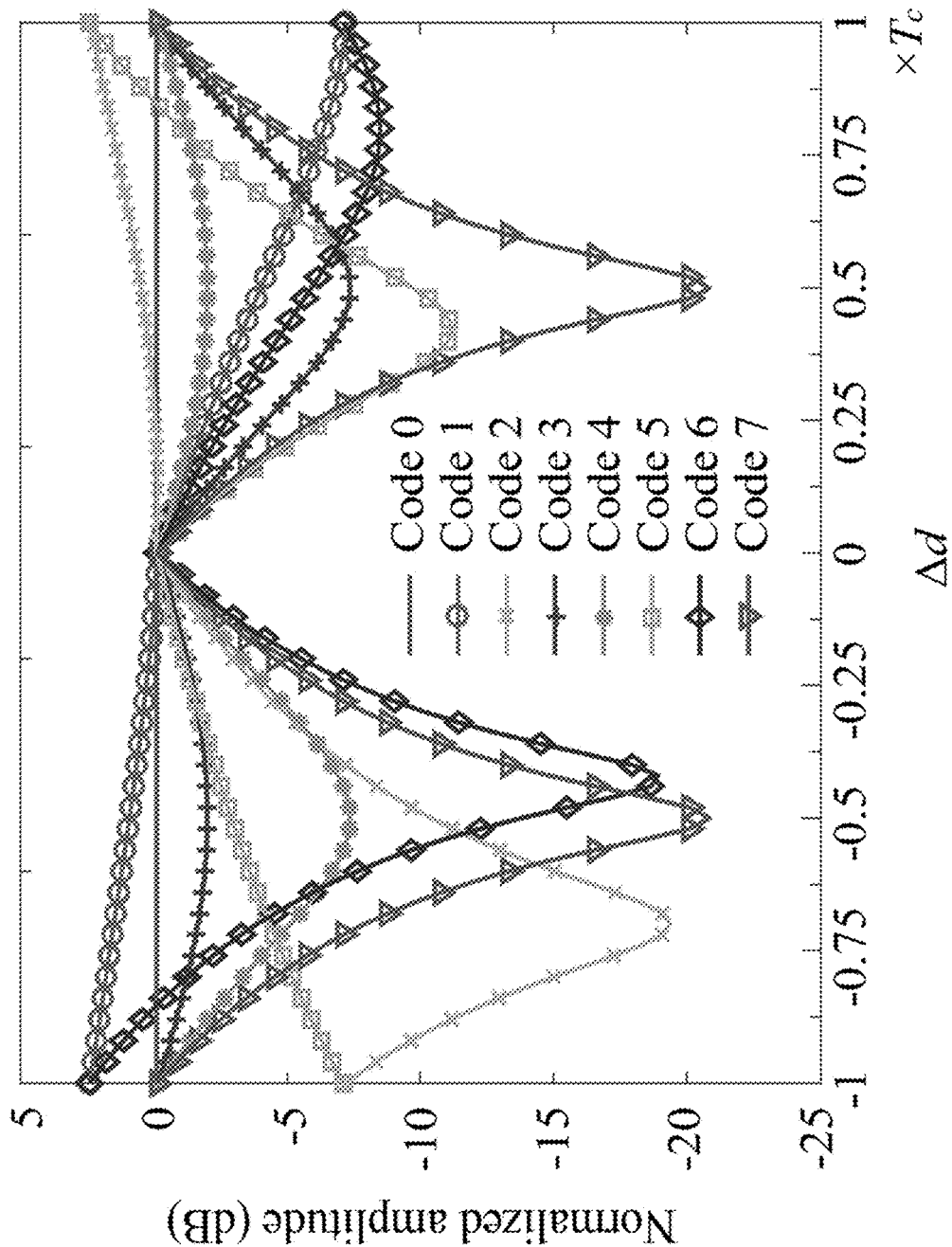
FIG. 7 shows the power of the decoded signal versus different offsets, according to embodiments of the present disclosure.

FIG. 7 shows the power of the decoded signal versus different offsets, according to embodiments of the present disclosure. In particular, FIG. 7 shows the output signal power in eight channels with different code offsets during decoding. It can be seen that only code 7 has the properties for synchronization. These properties of code 7 include 1) The maximum output power is obtained only when the offset is 0.2). The output power decrease significantly when the offset increases. Since not all the codes are suitable for synchronization, special code WS from {W1, W2, . . . WN} is selected for synchronization. An example of synchronization channel 1 is shown in FIG. 7. In order to synchronize channel 1, the code used in channel 1 is changed to the special code WS (see FIG. 6A), and the other codes are used for the remaining channels. On the analog & RF side of FIG. 6B, the RF switch in the power detector switches to P1 of FIG. 6B, which is from the coupler in Ch1. The output of the power detector 601 of FIG. 6B is converted into digital signal in FIG. 6A. For the algorithm 603 of FIG. 6A in the digital domain, it continuously monitoring the value from the ADC 602 of FIG. 6A, and at the same, adjusting the offset Ti of FIG. 6A to obtain the maximum value from the ADC, which means the code in Ch1 is synchronized. For the synchronization in other channels, we only need to change its code to WS, and repeat the same process.

Figure 8:
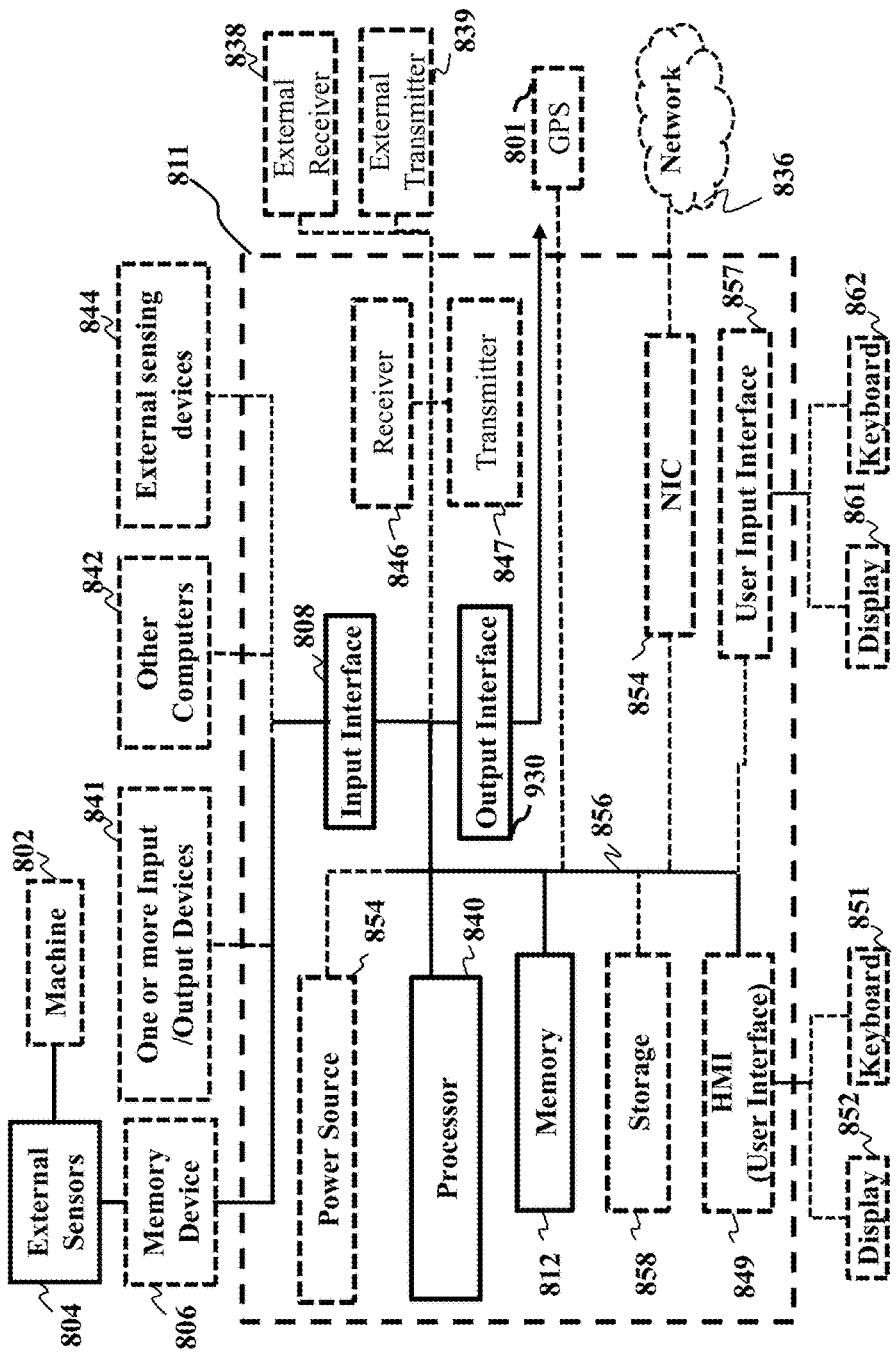
FIG. 8 is a block diagram illustrating an alternate computer or processor of an encoder for methods of the present disclosure, including the method illustrated in FIG. 1A, according to embodiments of the present disclosure.

FIG. 8 is a block diagram of illustrating an alternate computer or processor of an encoder for methods of the present disclosure, including the method illustrated in FIG. 1A, according to embodiments of the present disclosure. The encoder 811 includes a processor 840, computer readable memory 812, storage 858 and user interface 849 with display 852 and keyboard 851, which are connected through bus 856. For example, the user interface 849 in communication with the processor 840 and the computer readable memory 812, acquires and stores the data in the computer readable memory 812 upon receiving an input from a surface, keyboard surface, of the user input interface 857 by a user.

Contemplated is that the memory 812 can store instructions that are executable by the processor, historical data, and any data to that can be utilized by the methods and systems of the present disclosure. The processor 840 can be a single core processor, a multi-core processor, a computing cluster, or any number of other configurations. The processor 840 can be connected through a bus 856 to one or more input and output devices. The memory 812 can include random access memory (RAM), read only memory (ROM), flash memory, or any other suitable memory systems.

Still referring to FIG. 8, a storage device 858 can be adapted to store supplementary data and/or software modules used by the processor. For example, the storage device 858 can store historical data and other related data as mentioned above regarding the present disclosure. Additionally, or alternatively, the storage device 858 can store historical data similar to data as mentioned above regarding the present disclosure. The storage device 858 can include a hard drive, an optical drive, a thumb-drive, an array of drives, or any combinations thereof.

The system can be linked through the bus 856 optionally to a display interface (not shown) adapted to connect the system to a display device (not shown), wherein the display device can include a computer monitor, camera, television, projector, or mobile device, among others.

The encoder 811 can include a power source 854, depending upon the application the power source 854 may be optionally located outside of the encoder 811.

Still referring to FIG. 8, the data or other data, among other things, can be transmitted over a communication channel of the network 836, and/or stored within the storage system 858 for storage and/or further processing. Further, the data or other data may be received wirelessly or hard wired from a receiver 846 (or external receiver 838) or transmitted via a transmitter 847 (or external transmitter 839) wirelessly or hard wired, the receiver 846 and transmitter 847 are both connected through the bus 856. Further, a GPS 801 may be connected via bus 856 to the encoder 811. The encoder 811 may be connected via an input interface 808 to external sensing devices 844 and external input/output devices 841. The encoder 811 may be connected to other external computers 842. An output interface 809 may be used to output the processed data from the processor 840.

Figure 9:
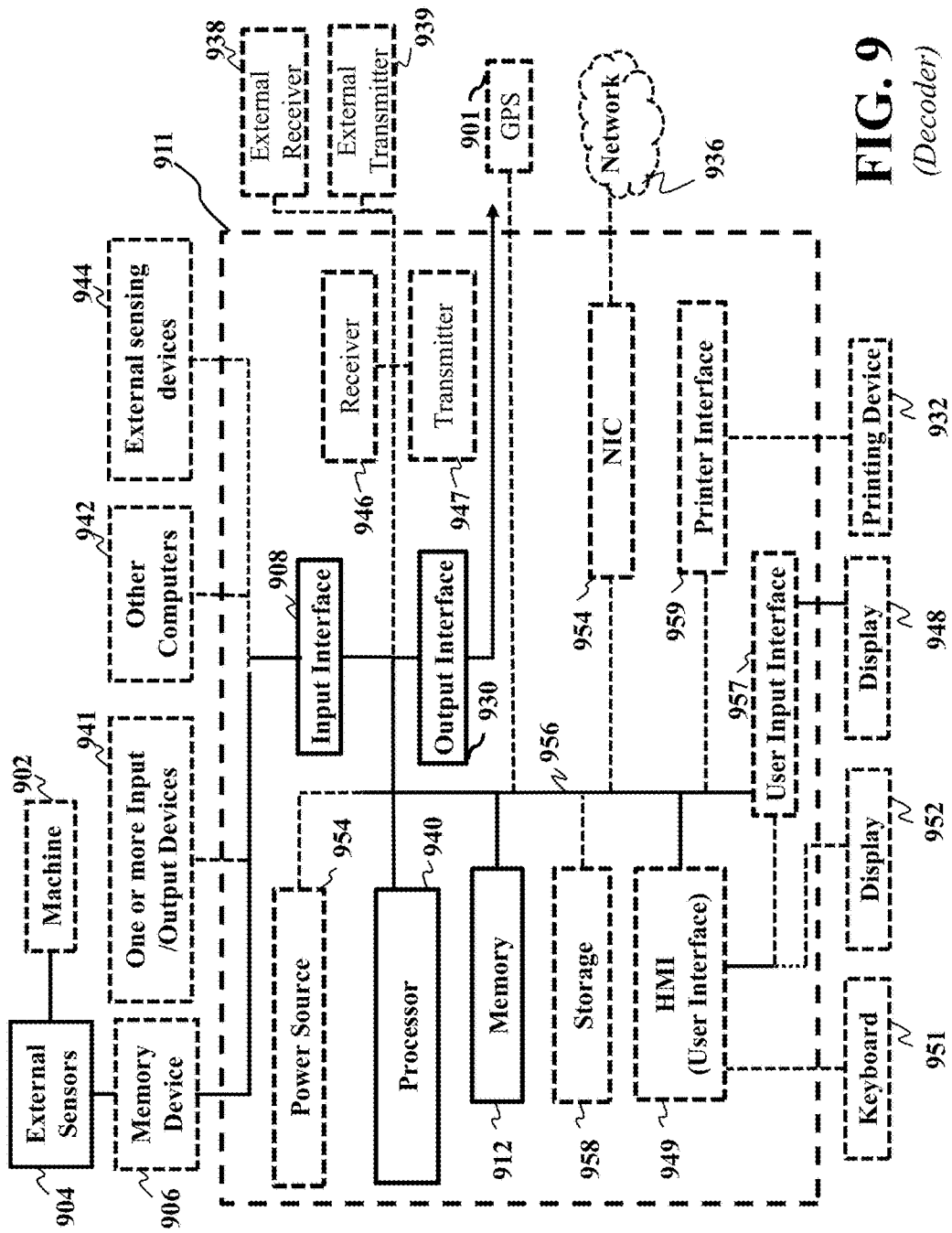
FIG. 9 is a block diagram of illustrating an alternate computer or processor of a decoder for methods of the present disclosure, including the method illustrated in FIG. 1A, according to embodiments of the present disclosure.

FIG. 9 is a block diagram of illustrating an alternate computer or processor of an decoder for methods of the present disclosure, including the method illustrated in FIG. 1A, according to embodiments of the present disclosure. The decoder 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the data in the computer readable memory 912 upon receiving an input from a surface, keyboard surface, of the user input interface 957 by a user.

Contemplated is that the memory 912 can store instructions that are executable by the processor, historical data, and any data to that can be utilized by the methods and systems of the present disclosure. The processor 940 can be a single core processor, a multi-core processor, a computing cluster, or any number of other configurations. The processor 940 can be connected through a bus 956 to one or more input and output devices. The memory 912 can include random access memory (RAM), read only memory (ROM), flash memory, or any other suitable memory systems.

Still referring to FIG. 9, a storage device 958 can be adapted to store supplementary data and/or software modules used by the processor. For example, the storage device 958 can store historical data and other related data as mentioned above regarding the present disclosure. Additionally, or alternatively, the storage device 958 can store historical data similar to data as mentioned above regarding the present disclosure. The storage device 958 can include a hard drive, an optical drive, a thumb-drive, an array of drives, or any combinations thereof.

The system can be linked through the bus 956 optionally to a display interface (not shown) adapted to connect the system to a display device (not shown), wherein the display device can include a computer monitor, camera, television, projector, or mobile device, among others.

The decoder 911 can include a power source 954, depending upon the application the power source 954 may be optionally located outside of the decoder 1011. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 934 is adapted to connect through the bus 956 to a network 936, wherein data or other data, among other things, can be rendered on a third party display device, third party imaging device, and/or third party printing device outside of the decoder 911.

Still referring to FIG. 9, the data or other data, among other things, can be transmitted over a communication channel of the network 936, and/or stored within the storage system 958 for storage and/or further processing. Further, the data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. Further, a GPS 901 may be connected via bus 956 to the decoder 911. The decoder 911 may be connected via an input interface 908 to external sensing devices 944 and external input/output devices 941. The decoder 911 may be connected to other external computers 942. An output interface 909 may be used to output the processed data from the processor 940.

The present description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A transmitter, comprising:
   a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains;
   a baseband processor to determine a set of digital signals for transmission from the set of RF chains, wherein there is one-to-one correspondence between a digital signal and an RF chain, wherein each digital signal has a phase shift with respect to another digital signal determined according to the AOD;
   an encoder to encode the set of digital signals with a set of binary codes to produce a set of encoded digital signals and to combine the set of encoded digital signals into a combined digital signal;
   a digital-to-analog converter to convert the combined digital signal into an analog domain to produce a combined analog signal; and
   a decoder to decode, using the set of binary codes, the combined analog signal into a set of analog signals having the phase shifts of the corresponding digital signals and to submit the set of analog signals into the corresponding RF chains.

2. The transmitter of claim 1, wherein the correspondence between the digital signal and analog signal is established through the same binary code used by the encoder to encode the digital signal and the decoder to decode the combined analog signal.

3. The transmitter of claim 2, wherein the decoder submits to the RF chain associated with the binary code a mixture of the combined analog signal and the binary code.

4. The transmitter of claim 1, wherein the binary codes in the set of binary codes are orthogonal to each other.

5. The transmitter of claim 4, wherein the binary codes include Walsh code.

6. The transmitter of claim 1, further comprising
a frequency up-converter to up-convert the frequency of the combined analog signal from baseband frequency to a carrier frequency such that the analog signals in the set of analog signals are RF signals.

7. The transmitter of claim 1, wherein each RF chain includes a frequency up-converter to up-convert the frequency of the analog signal from baseband frequency to a carrier frequency.

8. The transmitter of claim 1, wherein the encoder and the decoder are synchronized, such that the decoding of a portion of the combined RF signal encoded with a portion of the binary code is aligned with the portion of the binary code during the decoding.

9. The transmitter of claim 8, wherein the encoder and the decoder are synchronized using a feedback loop adjusting the alignment of the portion of the binary coded during the encoding and the decoding based on variations in power of the RF signals.

10. The transmitter of claim 1, further comprising:
a power detector to produce voltage levels indicative of variations in power of the analog signals;
an analog-to-digital converter to convert the voltage levels into digital voltage signals; and
a binary code adjustor to determine a set of offsets aligning the binary codes for the encoding and the decoding.

11. The transmitter of claim 10, wherein the binary code adjustor applies the offsets to the binary code used by the encoder and transmits the adjusted binary codes to the decoder.

12. The transmitter of claim 10, wherein the binary code adjustor determines the set of offset by optimizing a cost function using an extremum seeking method.

13. The transmitter of claim 10, wherein the binary code adjustor selects a subset of binary codes from the set of binary codes and uses only the subset of binary codes for the synchronization by applying, at different points of time, the subset of binary codes to encode different digital signals from the set of digital signals and to decode the corresponding analog signals.

14. The transmitter of claim 1, wherein the baseband processor modulates the combined digital signal to produce a modulated signal, and wherein the DAC includes a low-pass filter filtering the modulated signal to produce the combined analog signal.

15. The transmitter of claim 1, wherein the baseband processor determines the amplitude of each digital signal according to the AOD and parameters of a transmitted beam.

16. A transmitter, including a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains, wherein a baseband processor is configured to determine a set of digital signals for transmission from the set of RF chains, such that there is one-to-one correspondence between a digital signal and an RF chain, wherein each digital signal has a phase shift with respect to another digital signal determined according to the AOD, the transmitter further comprising:
an encoder to encode the set of digital signals with a set of binary codes to produce a set of encoded digital signals and to combine the set of encoded digital signals into a combined digital signal;
a digital-to-analog converter to convert the combined digital signal into an analog domain to produce a combined analog signal;
a decoder to decode, using the set of binary codes, the combined analog signal into a set of analog signals having the phase shifts of the corresponding digital signals and to submit the set of analog signals into the corresponding RF chains, wherein the correspondence between the digital signal and analog signal is established through the same binary code used by the encoder to encode the digital signal and the decoder to decode the combined analog signal.

17. The transmitter of claim 16, wherein the encoder and the decoder are synchronized, such that the decoding of a portion of the combined RF signal encoded with a portion of the binary code is aligned with the portion of the binary code during the decoding, wherein the encoder and the decoder are synchronized using a feedback loop adjusting the alignment of the portion of the binary coded during the encoding and the decoding based on variations in power of the RF signals, so that the synchronization of the codes at the encoder and the decoder maximizes a power level of the decoded signals.

18. A transmitter, including a set of radio-frequency (RF) chains, each RF chain includes a power amplifier, a band-pass filter, and an antenna for transmitting an analog signal using a beamforming with an angle of departure (AOD) defined by phase shifts of the analog signals transmitted by the set of RF chains, wherein a baseband processor is configured to determine a set of digital signals for transmission from the set of RF chains, such that there is one-to-one correspondence between a digital signal and an RF chain, wherein each digital signal has a phase shift with respect to another digital signal determined according to the AOD, the transmitter further comprising:
an encoder to encode the set of digital signals with a set of binary codes to produce a set of encoded digital signals and to combine the set of encoded digital signals into a combined digital signal;
a digital-to-analog converter to convert the combined digital signal into an analog domain to produce a combined analog signal; and
a decoder to decode, using the set of binary codes, the combined analog signal into a set of analog signals having the phase shifts of the corresponding digital signals and to submit the set of analog signals into the corresponding RF chains, wherein the encoder and the decoder are synchronized, and the power level of the decoded signals reaches to a maximum value.

19. The transmitter of claim 18, wherein the encoder and the decoder are synchronized, such that the decoding of a portion of the combined RF signal encoded with a portion of the binary code is aligned with the portion of the binary code during the decoding, wherein the encoder and the decoder are synchronized using a feedback loop adjusting the alignment of the portion of the binary coded during the encoding and the decoding based on variations in power of the RF signals, so that the synchronization of the codes at the encoder and the decoder maximizes a power level of the decoded signals.

20. The transmitter of claim 18, further comprising:
a power detector to produce voltage levels indicative of variations in power of the analog signals used for synchronization;
an analog-to-digital converter to convert the voltage levels into digital voltage signals; and a binary code adjustor to determine a set of offsets aligning the binary codes for the encoding and the decoding.

* * * * *